United States Patent [19]
Bolte

[11] Patent Number: 5,288,216
[45] Date of Patent: Feb. 22, 1994

[54] FAN UNIT FOR GENERATING GAS STREAMS

[75] Inventor: Ekkehard Bolte, Aachen, Fed. Rep. of Germany

[73] Assignee: U.S. Philips Corporation, New York, N.Y.

[21] Appl. No.: 76,376

[22] Filed: Jun. 14, 1993

Related U.S. Application Data

[63] Continuation of Ser. No. 795,605, Nov. 21, 1991, abandoned.

[30] Foreign Application Priority Data

Nov. 23, 1990 [DE] Fed. Rep. of Germany ....... 4037229

[51] Int. Cl.[5] .............................................. F04B 17/00
[52] U.S. Cl. ................................... 417/423.7; 310/62
[58] Field of Search ................. 417/423.7; 310/62, 63, 310/156

[56] References Cited

U.S. PATENT DOCUMENTS

| | | |
|---|---|---|
| 2,947,467 | 8/1960 | Palmer . |
| 4,603,271 | 7/1986 | Maruyama et al. ................ 310/62 |
| 5,017,103 | 5/1991 | Dahl ............................... 417/423.7 |
| 5,044,897 | 9/1991 | Dorman ......................... 417/423.7 |
| 5,070,268 | 12/1991 | Phelon et al. .................... 310/63 |

FOREIGN PATENT DOCUMENTS

| | | |
|---|---|---|
| 1428061 | 3/1969 | Fed. Rep. of Germany . |
| 2604849 | 8/1977 | Fed. Rep. of Germany . |
| 612736 | 8/1979 | Switzerland . |
| 1421770 | 1/1976 | United Kingdom . |

*Primary Examiner*—Richard A. Bertsch
*Assistant Examiner*—Alfred Basichas
*Attorney, Agent, or Firm*—Ernestine C. Bartlett

[57] ABSTRACT

The invention relates to a fan unit for generating gas streams, in particular for vacuum cleaners, which unit comprises a motor (4) and an impeller wheel (1) which is also electromagnetically active and in conjunction with electromagnetically active parts (19) of the motor stator (3) generates the torque of the impeller wheel via an air gap (11) formed between radial surfaces of the impeller wheel and the motor stator, the electromagnetically active part of the impeller wheel (1) being a conductive disc (7) which is arranged in a radial plane and which has one radial surface (8) bounding the air gap (11) at the rotor side, and the air gap being bounded at the stator side by planar stator poles (19) formed on a radial bounding surface (12) of an iron cylinder (15) by the provision of radial slots (17) in which the coils (20) are arranged.

16 Claims, 3 Drawing Sheets

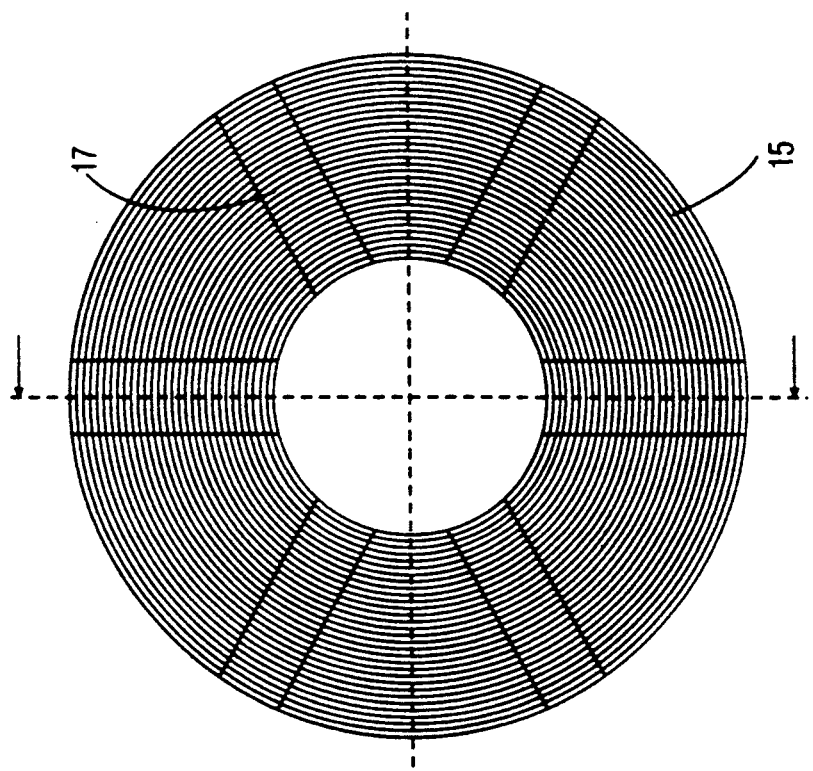
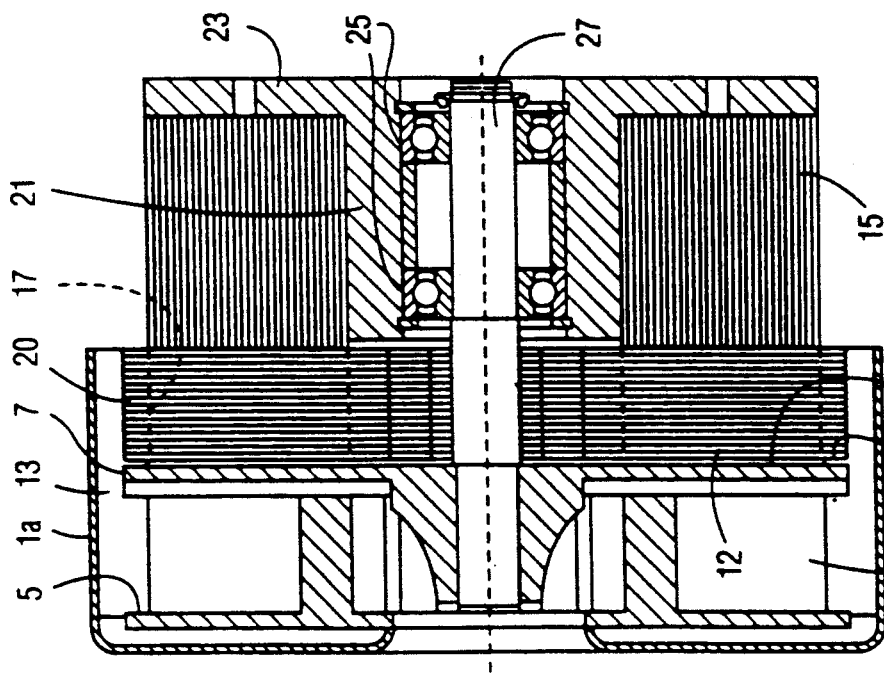
FIG. 2a
FIG. 2b

FAN UNIT FOR GENERATING GAS STREAMS

This is a continuation of application Ser. No. 07/795,605, filed Nov. 21, 1991 now abandoned.

FIELD OF THE INVENTION

The invention relates to a fan unit for generating gas streams, in particular for vacuum cleaners, which unit comprises a motor and an impeller wheel which is also electromagnetically active and in conjunction with electromagnetically active parts of the motor stator generates the torque of the impeller wheel via an air gap formed between radial surfaces of the impeller wheel and the motor stator.

BACKGROUND OF THE INVENTION

CH-PS 612,736 describes a small fan having a fan wheel with radially acting vanes. Moreover, the fan wheel has permanent magnets at the location of the air gap to form poles of alternating polarity along the air gap in the circumferential direction. At the location of the air gap the permanent-magnetic poles of the rotor, which are disposed in a radial plane, are situated opposite stator poles which are arranged in radial planes and which can be energized by coils. When the coils are energized electric fields are produced in the air gap and exert a torque on the rotor.

This construction is intricate because in addition to the fan wheel permanent magnets are required. On account of the principle used it is required to detect the position of the fan wheel for the energization of the coils. Moreover, the use of the permanent magnets as shown limits the maximum speed and the temperature to values restricting the field of use.

Since with vacuum cleaners the power consumption is still a typical indication of their efficiency, vacuum cleaners employ comparatively efficient separate motors to drive a separate impeller. Generally, the mounting volume of such a unit comprising an impeller and a motor is comparatively large. Recently, the manufacturers have begun to specify not only the power consumption of the appliance but also its suction power at the nozzle.

Conventional vacuum cleaners also have the disadvantage that the separate construction of the impeller and the motor is in conflict with appliance miniaturization. At a speed of the order of magnitude of 25,000 r.p.m. there is a distinct noise production, which is mainly caused by the brushes of the universal motors which are used. The poor efficiency of the currently used units results in considerable heating of the motor. In order to carry off this dissipated heat the suction air stream is passed through or over the motor. This results in additional flow noise and flow losses.

SUMMARY OF THE INVENTION

An object of the invention is to provide a fan unit which is less noisy and more efficient and which, in addition, can be miniaturized.

According to the invention this object is achieved in that the electromagnetically active part of the impeller wheel is a conductive disc which is arranged in a radial plane and which has one radial surface bounding the air gap at the rotor side, and at the stator side the air gap is bounded by planar stator poles formed on a radial bounding surface of an iron cylinder by the provision of radial slots in which the coils are arranged.

In such a unit the impeller wheel can be journalled in the customary manner and the impeller itself can, as until now, be bounded axially by conductive radial discs. A functional difference is that one of the radial discs of the impeller wheel acts as an eddy-current disc of the axial-flow induction motor, the eddy current being generated by the stator pole faces. Since the stator is a stationary part it can be combined with the bearing support of the impeller wheel. In this way the drive unit of a vacuum cleaner can be miniaturized distinctly.

In a further embodiment of the invention, the unit comprises an iron cylinder is made of a coiled iron band. Such an iron cylinder can be formed exactly with slots impressed from one side of the band, which precludes problems in forming the slots after coiling.

In a further embodiment of the invention the electrically or magnetically conductive disc of the rotor is a basic disc of the impeller wheel. With such a construction the impeller wheel of the compressor is used directly as the rotor of the motor.

In a further embodiment of the invention the electrically conductive disc is made of aluminum. Since the impeller of a compressor is generally made of aluminum it is merely necessary to adapt the thickness to the requirements imposed by the power to be produced. Effective use is made of the properties of aluminum, i.e. a high mechanical strength, a low specific gravity and a high electrical conductivity.

In a further embodiment of the invention the electrically conductive basic disc of the rotor is backed with a disc of a high-permeability material at its side which is remote from the air gap. In a modification of this embodiment, the disc of a high-permeability material is made of iron.

In a further embodiment of the invention, for the purpose of reducing eddy currents, the magnetically conductive backing disc is made of a coiled electric-sheet band. This results in a further improvement of the motor efficiency.

In a further embodiment of the invention the basic disc of the impeller wheel is made of solid iron. This disc provides a satisfactory combination of electrical and magnetic conductivity.

The motor output can also be improved in that the outer and inner edges of the circular solid-iron disc are in contact with parts of a highly conductive material, which parts of a highly conductive material may be constructed as copper rings.

In a further embodiment of the invention the electrically and/or magnetically conductive disc of the impeller wheel is constructed as a squirrel cage made of a solid permeable material or a lamellar permeable material.

In a further embodiment of the invention the axial-flow induction motor is energized by means of a frequency changer, the speed setting being derived from process-dependent nominal values and adjustable set-point values. This enables the operating speed of the motor to be increased from 25,000 to 50,000 r.p.m. The high speed also enables the turbine efficiency to be improved. The adjustment possibilities allow the suction power to be optimized for a specific requirement. In addition, control is possible by means of additional pressure sensors.

In a further embodiment of the invention the set-point values are the primary frequency and the stator current or the stator voltage. Likewise, in a further embodiment the actual speed value is a measurement value or is derived from electrical parameters of the motor. By thus processing the operating functions in the axial-flow induction motor it is possible to dispense with mechanical or electrical sensors.

BRIEF DESCRIPTION OF THE DRAWINGS

The invention will now be described in more detail, by way of example, with reference to the drawings. In the drawings:

FIG. 2a is a sectional view of the fan unit, FIG. 2b is a front view of the stator assembly prior to winding.

DETAILED DESCRIPTION OF PREFERRED EMBODIMENTS

Figure 1:
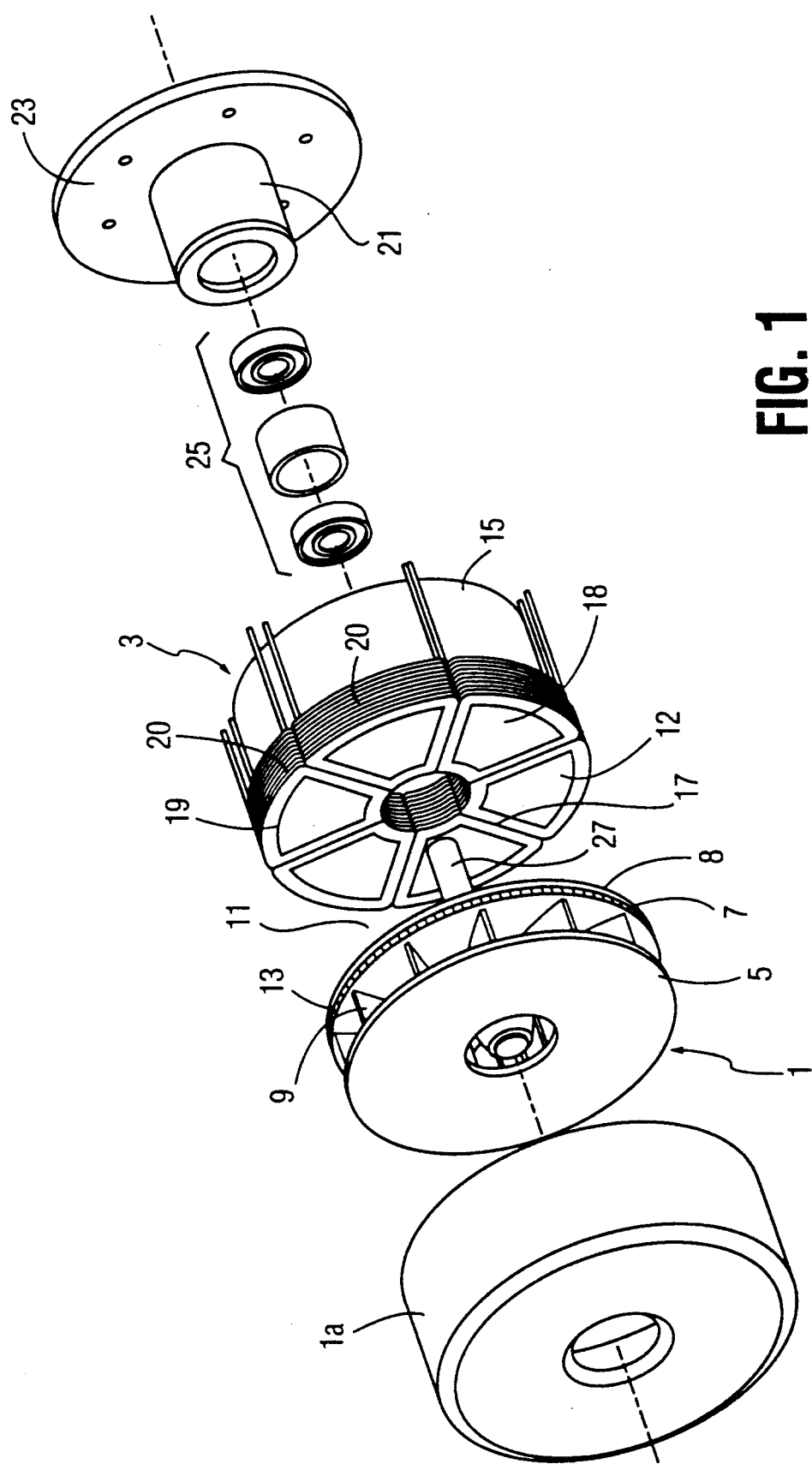
FIG. 1 is an exploded view showing a fan unit with an impeller wheel, which also constitutes the rotor of an axial-flow induction motor, and the associated stator.

The fan unit shown in an exploded view in FIG. 1 comprises an impeller wheel 1 with a housing 1a and a stator 3 of an axial-flow induction motor. In the present embodiment the impeller wheel 1 comprises two parallel aluminum discs 5 and 7 between which impeller vanes 9 extend. The aluminum disc 7 is used as the eddy-current rotor of the axial-flow induction motor to which the stator 3 belongs. The disc 7, which functions as the basic disc of the impeller wheel 1, thus adjoins the air gap 11 of the axial-flow induction motor with a radial surface 8 in the operating position of the impeller wheel 1 and the stator 3.

In the embodiment shown in FIGS. 1, 2a and 2b the radial surface of the disc 7 which is remote from the air gap 11 has been provided with a disc 13 of a high-permeability material, preferably of solid iron or of coiled electric sheet. In this way the impeller wheel has an electrically conductive layer 7 adjacent the air gap 11 and a magnetically conductive layer 13 behind it. The magnetically conductive layer is formed by the solid iron disc 13. However, in order to suppress eddy currents the disc 13 may be made of a wound electric-sheet band.

In an embodiment not shown the aluminum disc 7 has been dispensed with. The solid iron disc 13 then functions as a secondary part for the motor. Moreover, the embodiment thus obtained can be modified in that the outer and inner edges of the solid iron circular disc 13 are in contact with copper rings, not shown. This reduces the secondary electrical resistance.

The stator 3 comprises an iron cylinder 15 (FIGS. 2a and 2b) formed by coiling an electric-sheet band. From the radial surface 12 adjacent the air gap 11 the cylinder is formed with slots 17 between which stator poles 18 are formed. These stator poles 18 terminate in the air gap 11 with radial pole faces 19. In the present example six coils 20 are arranged in six slots 17. The coils 20 are arranged to form a single or multi-section winding. Alternatively, other winding configurations than shown may be used. Apart from this, a different number of slots may be used depending on the power rating, in which case the winding arrangement should be adapted accordingly.

The iron cylinder 15 is mounted on a supporting sleeve 21 of a base 23. The supporting sleeve 21 accommodates a bearing 25 for an impeller shaft 27.

Figure 3:
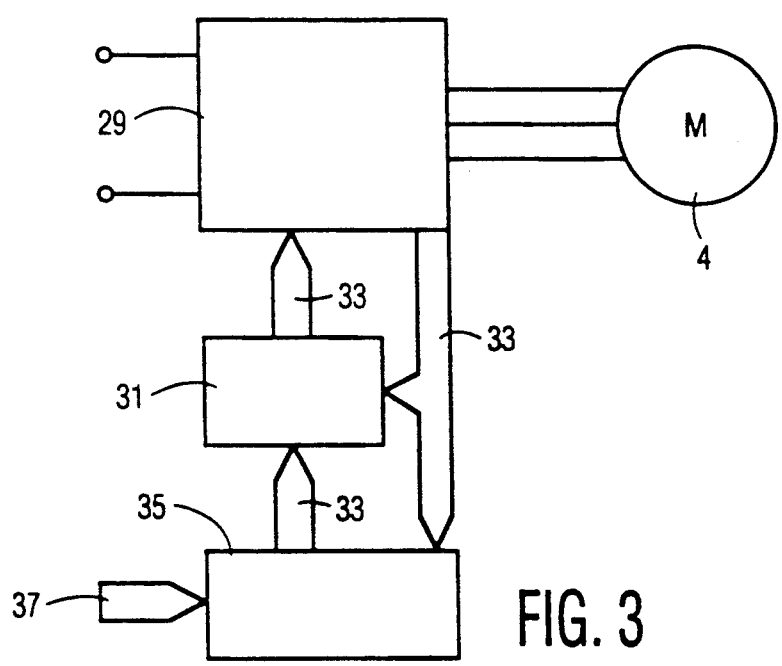
FIG. 3 is a block diagram of the power supply and control circuit of the axial-flow induction motor in the fan unit shown in FIG. 1.

FIG. 3 shows a control circuit for the axial-flow induction motor 4 shown in FIG. 1. It comprises a frequency changer 29 which energizes the winding of the motor 4. The speed setting is derived from process-dependent nominal values and adjustable set-point values. There is provided a signal shaper 31 which receives set-point or actual values in the form of the primary frequency as well as the stator current or the stator voltage via lines 33.

Moreover, it is possible to derive a speed setting and/or power setting from process-dependent nominal values and set-point values. The process controller 35 can derive actual values, for example for the speed and suction power, from electrical parameters. The nominal speed value can be preset on the process controller 35, for example by means of a manual control element 37; or alternatively, it may be derived from a process sensor.

I claim:

1. A fan unit for generating gas streams, in particular for vacuum cleaners, which unit comprises a motor (4) having a motor axis and an impeller wheel (1) which is also electromagnetically active and in conjunction with electromagnetically active parts (19) of the motor stator (3) generates the torque of the impeller wheel via an air gap (11) extending perpendicular to the motor axis, and formed between surfaces of the impeller wheel (1) and the motor stator (3), wherein the electromagnetically active part of the impeller wheel (1) is a conductive disc (7) which is arranged in a plane extending perpendicular to the motor axis and which has one surface (8) extending perpendicular to the motor axis and bounding the air gap (11) at the rotor side, and at the stator side the air gap is bounded by planar stator poles (19) formed on a radial bounding surface (12) of an iron cylinder (15), extending perpendicular to the motor axis, by the provision of radial slots (17) in which the coils (20) are arranged.

2. A fan unit as claimed in claim 1, wherein the iron cylinder (15) is made of a coiled iron band.

3. A fan unit as claimed in claim 1, wherein the conductive disc (7) of the rotor is a disc of the impeller wheel.

4. A fan unit as claimed in claim 3, wherein the electrically conductive disc (7) is made of aluminum.

5. A fan unit as claimed in claim 1, wherein the electrically conductive disc (7) of the rotor is backed with a backing disc (13) of a high-permeability material at its side which is remote from the air gap.

6. A fan unit as claimed in claim 5, wherein the backing disc (13) is made of solid iron.

7. A fan unit as claimed in claim 6, wherein for the purpose of reducing eddy currents the magnetically conductive backing disc (13) is made of a coiled electric-sheet band.

8. A fan unit as claimed in claim 3, wherein the disc (7) of the impeller wheel (1) is made of solid iron.

9. A fan unit as claimed in claim 8, characterised in that the outer and inner edges of the circular solid-iron disc are in contact with parts of a highly conductive material.

10. A fan unit as claimed in claim 9, wherein the parts of a highly conductive material are constructed as copper rings.

11. A fan unit as claimed in claim 1, wherein the conductive disc (7) of the impeller wheel (1) is constructed as a squirrel cage made of a solid permeable material or a lamellar permeable material.

12. A fan unit as claimed in claim 1, wherein the axial-flow induction motor (4) is energized by means of a frequency changer (29), the speed setting being derived from process-dependent nominal values and adjustable set-point values.

13. A fan unit as claimed in claim 12, wherein the set-point values are the primary frequency and the stator current.

14. A fan unit as claimed in claim 12, wherein the actual speed value is a measurement value.

15. A fan unit as claimed in claim 12, wherein the set-point values are the primary frequency and the stator voltage.

16. A fan unit as claimed in claim 12, wherein the actual speed value is derived from electrical parameters.

* * * * *